United States Patent
Cannon et al.

(10) Patent No.: US 6,729,537 B2
(45) Date of Patent: May 4, 2004

(54) SYSTEM AND METHOD FOR AUTOMATING TELECOMMUNICATIONS SESSION INITIATION AND CALLING CARD FOR USE THEREWITH

(75) Inventors: Joseph M. Cannon, Harleysville, PA (US); James A. Johanson, Macungie, PA (US); Philip D. Mooney, Sellersville, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/917,105

(22) Filed: Jul. 27, 2001

(65) Prior Publication Data

US 2003/0019925 A1 Jan. 30, 2003

(51) Int. Cl.$^7$ .............................................. G06F 17/00
(52) U.S. Cl. ...................... 235/375; 235/380; 235/480; 235/487
(58) Field of Search ................................ 235/375, 380, 235/480, 487, 462.01, 462.49, 472.03, 493; 455/564, 557; 379/100.14, 904, 910

(56) References Cited

U.S. PATENT DOCUMENTS

| | | | |
|---|---|---|---|
| 4,535,204 A | * 8/1985 | Hughes et al. | 235/462.49 |
| 4,817,136 A | * 3/1989 | Rhoads | 379/357.01 |
| 4,868,849 A | * 9/1989 | Tamaoki | 379/357.01 |
| 4,897,865 A | * 1/1990 | Canuel | 379/144.01 |
| 4,945,219 A | * 7/1990 | Tanaka | 235/487 |
| 5,144,654 A | * 9/1992 | Kelley et al. | 379/355.09 |
| 5,288,976 A | * 2/1994 | Citron et al. | 235/375 |
| 5,393,964 A | * 2/1995 | Hamilton et al. | 235/381 |
| 5,465,291 A | * 11/1995 | Barrus et al. | 379/67.1 |
| 5,493,105 A | * 2/1996 | Desai | 235/375 |
| 5,621,787 A | * 4/1997 | McKoy et al. | 379/121.06 |
| 5,640,193 A | * 6/1997 | Wellner | 725/100 |
| 5,701,339 A | * 12/1997 | Suda | 379/199 |
| 5,789,732 A | * 8/1998 | McMahon et al. | 235/487 |
| 6,058,304 A | * 5/2000 | Callaghan et al. | 455/422 |
| 6,085,171 A | * 7/2000 | Leonard | 705/26 |
| 6,218,964 B1 | * 4/2001 | Ellis | 340/990 |
| 6,374,259 B1 | * 4/2002 | Celik | 707/104.1 |
| 6,453,175 B2 | * 9/2002 | Mizell et al. | 455/557 |
| 2001/0044324 A1 | * 11/2001 | Carayiannis et al. | 455/564 |

FOREIGN PATENT DOCUMENTS

TW        290774 A    * 11/1996

OTHER PUBLICATIONS

Bluetooth Specification, Version 1.1; pp. 17–32; Feb. 22, 2001.

* cited by examiner

*Primary Examiner*—Michael G. Lee
*Assistant Examiner*—Ahshik Kim

(57) ABSTRACT

A system and method for automating the initiation of a telecommunications session and a calling card to use with the system or the method. In one embodiment, an automated telephony interface system includes a scanner and a session initiator which is coupled to the scanner. The initiator extracts a telephone number from information read by the scanner and transmits a signal containing the telephone number to a telecommunications device in order to initiate a telecommunications session.

11 Claims, 3 Drawing Sheets

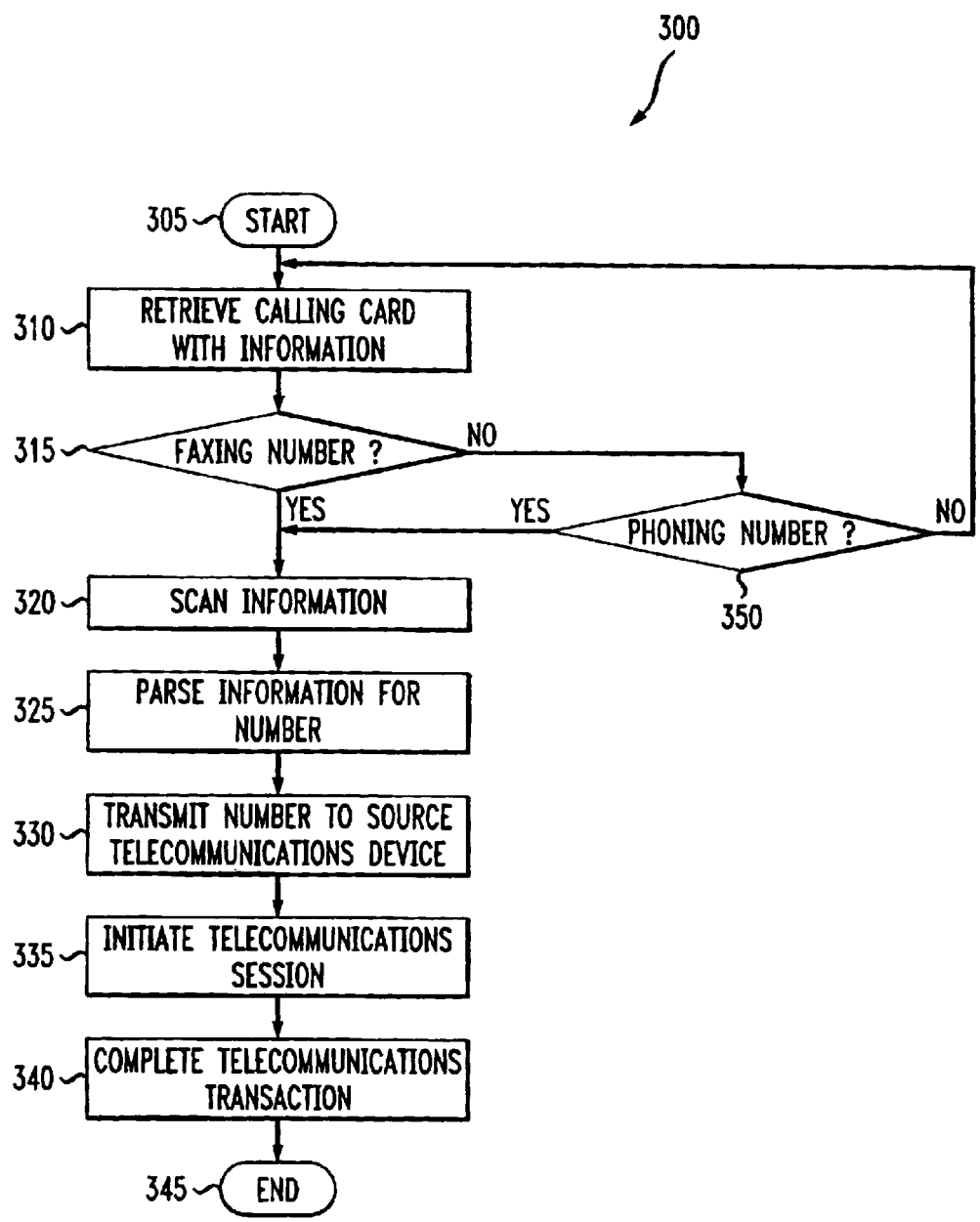

SYSTEM AND METHOD FOR AUTOMATING TELECOMMUNICATIONS SESSION INITIATION AND CALLING CARD FOR USE THEREWITH

TECHNICAL FIELD OF THE INVENTION

The present invention is directed, in general, to an information system and, more specifically, to a system and method for automating telecommunications session initiation and a calling card for use with the system or the method.

BACKGROUND OF THE INVENTION

Communication is essential in any profession. The exchange of information cards is a common way of initiating communication. Information cards are tangible objects which individuals personally exchange and collect from others. These cards are widely used and studies have indicated that individuals may retain approximately 150 of these cards at any one time.

Besides serving as a vehicle of introduction, information cards also serve as compact sources of pertinent information needed to define or provide contact information for an individual associated with the card. Individuals may use these accumulated collection of cards to remind them of the persons they have met, their affiliations and titles or as a resource for certain other subject matters. The information on exchanged cards, however, is primarily used to begin or continue communication between the card's recipient and the represented individual or organization.

Typically, these information cards contain several communication options in which an individual can contact a represented person or business. Common modes of communication now include a mailing address, phone number, cellular phone number, beeper number, email address and a fax number.

Establishing and maintaining contact with a recipient of a card may be determined upon the information given to the recipient and the way that information is presented. Several types of information cards, therefore, are currently being used to increase the potential for contact by presenting a certain image and providing vital, directed information. Cards are now printed on wood, metal, plastic and ornate paper in an effort for recipients to retain the distributed cards.

Electronic business cards have also surfaced as another alternative. These types of business cards allow individuals with personal digital assistants (PDA)s or cell phones to exchange information without exchanging a tangible object. Essentially all the various types of cards present ways to contact the represented person or organization in a familiar form that is easy to store and retrieve.

Although the information contained on these cards is somewhat limited, their utility is amazingly broad. Though presented in simple format, however, an individual must still correctly read and use the information contained on a card, for it to be useful. For example, one common error occurs while attempting to send a fax but mistakenly reading the phone number from a card instead of the fax number.

Besides being prone to errors, reading a fax number and manually entering it is also time consuming. Though electronic business cards provide a possible improvement for using the distributed information without human error, they are only useful to those who have a machine capable of receiving the information. Thus someone who uses an electronic business card must also have traditional business cards to distribute.

Accordingly, what is needed in the art is a way to enhance the use of an information card to facilitate the use of the card in desired communications.

SUMMARY OF THE INVENTION

To address the above-discussed deficiencies of the prior art, the present invention provides a system and method for automating the initiation of a telecommunications session and a calling card to use with the system or the method. In one embodiment, an automated telephony interface system for use with a telecommunications device includes: (1) a scanner and (2) a session initiator which is coupled to the scanner that extracts a telephone number from information read by the scanner and transmits a signal containing the telephone number to the telecommunications device in order to initiate a telecommunications session.

In another aspect, the present invention provides a method of initiating a telecommunications session that includes: (1) parsing information which was scanned from a calling card in order to extract a telephone number and (2) transmitting a signal containing the telephone number to a telecommunications device in order to cause the telecommunications device to initiate the telecommunications session.

In another aspect, the present invention provides a calling card that includes: (1) human-readable information located on the calling card and (2) machine-readable information located on the calling card which is an encoded version of the human-readable information and is employable by an application without requiring a supporting database to contain the user information.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 3 illustrates a flow diagram of an embodiment of a method of initiating a telecommunications session constructed according to the principles of the present invention.

DETAILED DESCRIPTION

Figure 1:
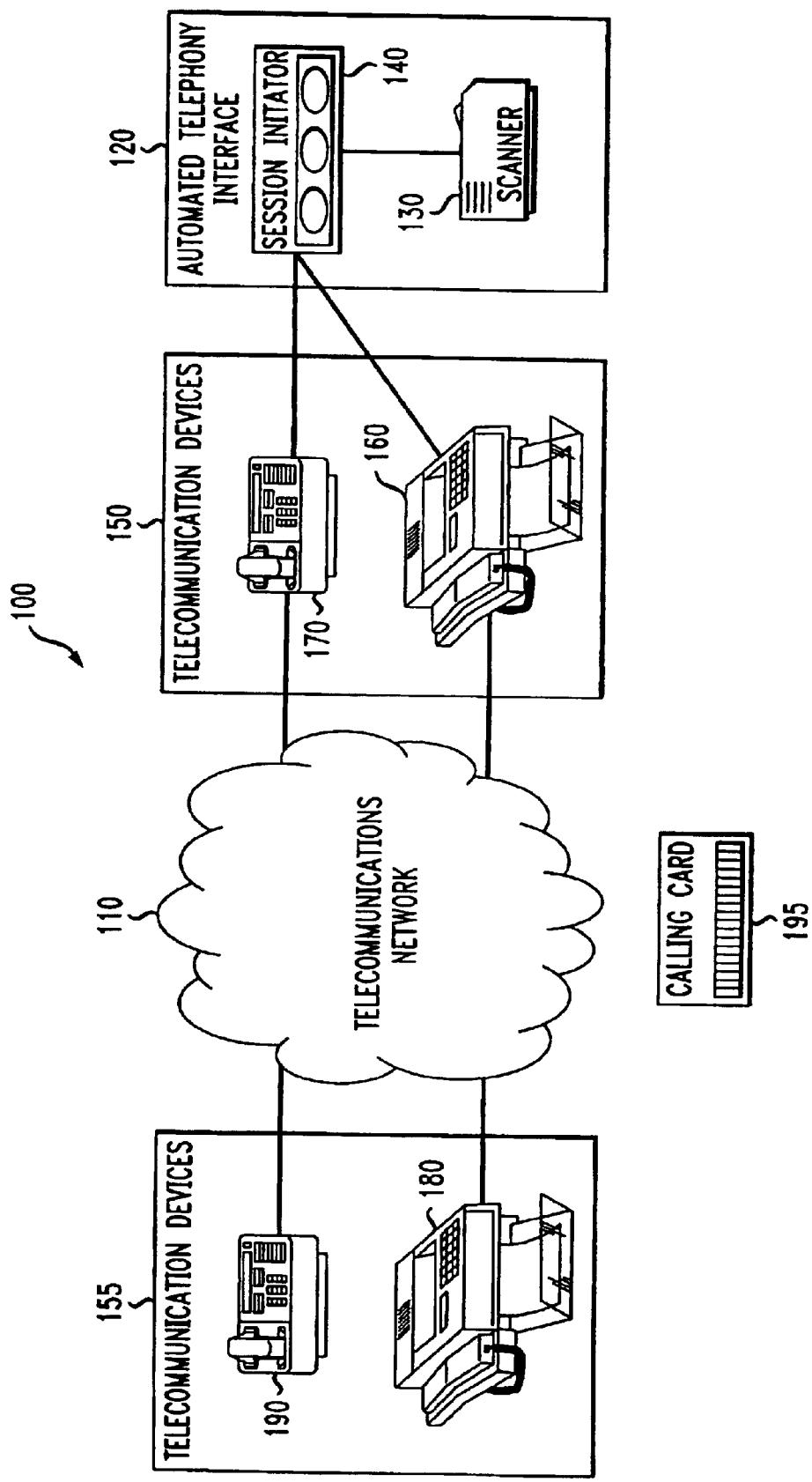
FIG. 1 illustrates a network diagram of an embodiment of a telecommunication system constructed in accordance with the principles of the present invention.

Referring initially to FIG. 1, illustrated is a network diagram of an embodiment of a telecommunication system, generally designated 100, constructed in accordance with the principles of the present invention. The telecommunication system 100 includes a telecommunications network 110, an automated telephony interface 120, source and destination telecommunications devices 150, 155, employable by a calling card 195. The automated telephony interface 120 includes a scanner 130 and a session initiator 140. The source telecommunications devices 150 include a source facsimile (fax) machine 160 and a source telephone 170. Similarly, the destination telecommunications devices 155 include a destination fax machine 180 and a destination telephone 190. The source and destination fax machines 160, 180 and telephones 170, 190 are standard devices that are commonly available.

The telecommunications network 110, in the illustrated embodiment, may be any network that supports respective communication between fax machines, telephones or other telecommunications devices. The telecommunications network 110 may be either wireless, hardwired or a combination of the two. One skilled in the pertinent art also understands that the telecommunications network 110 may employ communications between any number of source or destination telecommunications devices 150, 155. In an alternative embodiment, the source and destination telecommunications devices 150, 155 may include only one of either the fax machines 160, 180 or the telephones 170, 190 as appropriate.

In the illustrated embodiment, the automated telephony interface 120 employs the scanner 130, which is coupled to the session initiator 140, to initially decode or read information presented to it via the calling card 195. The session initiator 140 then parses this information, presented by the scanner, to extract a telephone number. The session initiator 140 subsequently transmits a signal containing the telephone number to at least one of the source telecommunications devices 150 to automatically initiate a telecommunications session. One of the source telecommunications devices 150 then contacts an appropriate one of the destination telecommunications devices 155 via the telecommunications network 110.

The scanner 130 may utilize a broad array of technologies to accomplish its scanning process. In the illustrated embodiment of FIG. 1, the scanner 130 employs a magnetic reader to recognize the appropriate information contained in a magnetic strip on the calling card 195. In an alternative embodiment, an optical reader may be employed to recognize the appropriate information contained in a bar-coded strip on the calling card 195. Another embodiment may employ Bluetooth technology wherein the calling card 195 may incorporate an electronic circuit capable of responding in a Bluetooth communications environment as defined in the Bluetooth Specification, Version 1.1 and incorporated herein by reference. A copy of the Bluetooth Specification, Version 1.1 can be obtained at http://www.bluetooth.com/.

In the illustrated embodiment, the calling card 195 is a business card that contains business-specific information directly related to the person giving the calling card 195. A calling card 195 of this nature will be further discussed with respect to FIG. 2, below. In an alternative embodiment, the information on the calling card 195 may refer to catalog information about related products or services. In yet another embodiment, the calling card 195 may be an advertisement for products or services.

The session initiator 140 accepts the information presented by the scanner 130 and parses it to identify an appropriate telephone number. The information is analyzed and an appropriate telephone number is extracted from machine-readable information that has been arranged in a standard sequence. In an alternative embodiment the session initiator 140 extracts the telephone number for faxing or phoning by seizing a ten digit number following an alpha or numeric flag or indicator contained within the information. Of course, other current or future techniques may be employed to identify the appropriate telephone number.

The session initiator 140 also determines whether to use the extracted telephone number to initiate faxing or phoning. In the present embodiment, this determination is based on a user-input that has been manually entered into the session initiator 140. In another embodiment, faxing or phoning may be determined based on a user-input entered into the scanner 130. An example of a user-input may be a switch on the scanner 130 or the session initiator 140 that indicates faxing or phoning. Alternative embodiments may also include determination of the use of the extracted telephone number based on a direction the information is swiped or entered into the scanner 130, or if the fax machine is ready to fax or if a particular telephone line has been chosen.

The session initiator 140, in the illustrated embodiment, is a dedicated device that is constructed of special-purpose hardware employing a software program, which directs its operation. Other embodiments, of course, may employ a device that is solely hardwired or that is solely software enabled using general purpose hardware such as a computer. After extracting the telephone number, the session initiator 140 then transmits the telephone number to one of the source telecommunications devices 150. The telephone number may be transmitted over a hardwired connection, as illustrated in FIG. 1, or it may be transmitted using a wireless connection including Bluetooth or other technologies.

The session initiator 140 automatically initiates a dialing sequence for the intended source fax machine 160 or the source telephone 165. The selected source telecommunications device 150 then attempts to contact, using the extracted telephone number, the appropriate one of the designated destination telecommunications devices 155 through the telecommunications network 110. The destination telecommunications devices 155 may be located anywhere that is accessible by the telecommunications network 110.

Figure 2:
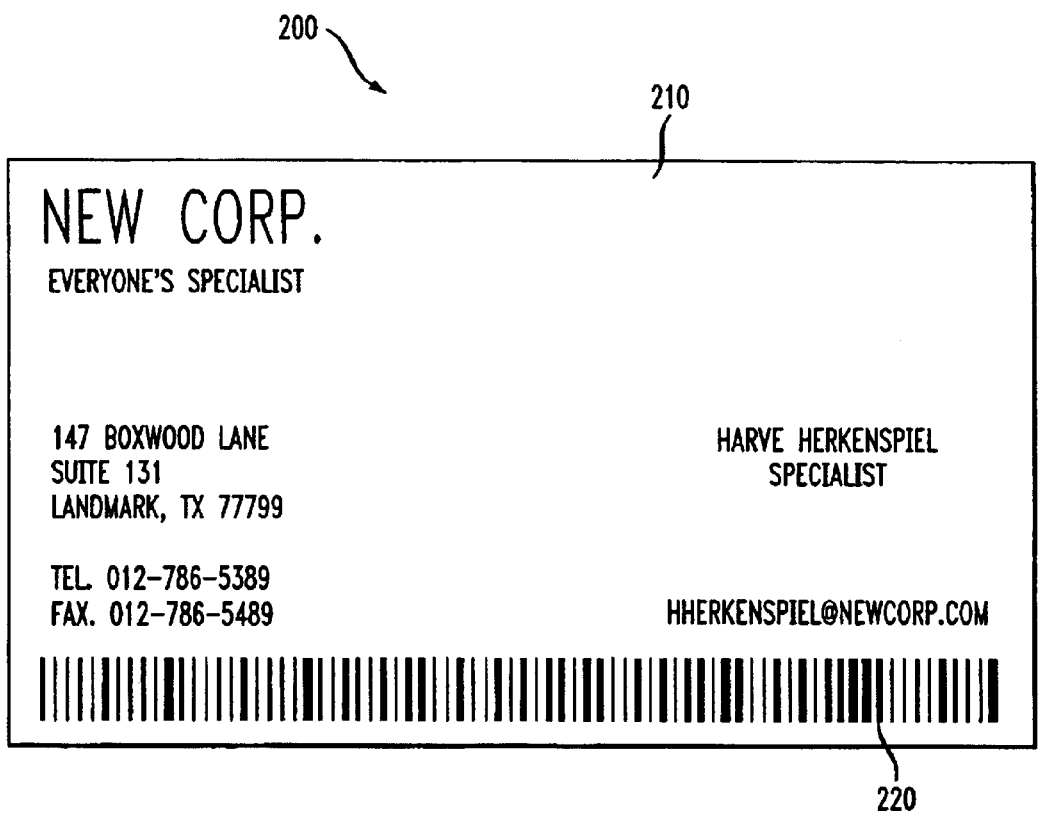
FIG. 2 illustrates an embodiment of a calling card constructed according to the principles of the present invention.

Turning now to FIG. 2, illustrated is an embodiment of a calling card 200 constructed according to the principles of the present invention. The calling card 200 includes human-readable information 210 and machine-readable information 220. As shown in FIG. 2, both the human and machine-readable information 210, 220 may be located on a common side of the calling card 200. Alternatively, the human-readable information 210 and the machine-readable information 220 may be located on opposite sides of the calling card 200.

The human-readable information 210 located on the calling card 200 may typically include business-related information about a person associated with the calling card 200. Correspondingly, the machine-readable information 220 located on the calling card 200 is an encoded version of the human-readable information 210. The machine-readable information 220 may be employed by an application (e.g., a software application) without requiring a supporting database to contain user information.

The machine-readable information 220 is encoded in a bar-coded strip, as shown in FIG. 2, employing both alpha and numeric encoding. Alternatively, the machine-readable information 220 may be encoded in a magnetic strip. The machine-readable information 220 may also be arranged in a predetermined sequence, which would directly correlate to a sequence in which the human-readable information 210 is arranged on the calling card 200. For instance, the machine-readable information 220 may be arranged to follow the human-readable information 210 from top-to-bottom and left-to-right as arranged on the calling card 200.

As discussed above with respect to FIG. 1, the calling card 200 may be used to initiate a telecommunications session. Alternatively, the calling card 200 may be used to record the human-readable information 210 in a user selected database or on a device. For example, a user may record the human-readable information 210 of the calling card 200 on a personal digital assistant by scanning the machine-readable information 220 which may be encoded as a bar-coded strip.

Turning now to FIG. 3, illustrated is a flow diagram of an embodiment of a method of initiating a telecommunications session, generally designated 300, constructed according to the principles of the present invention. The method 300 starts in a step 305 with an intent to initiate a telecommunications session using a calling card.

The calling card containing appropriate information is retrieved in a step 310. In one embodiment, the information on the calling card is business-related wherein the information is both human-readable and machine-readable. The machine-readable information may be contained in a magnetic strip, a bar-coded strip, or any other encoded version on the calling card.

After retrieving the calling card in the step 310, a first decisional step 315 determines if the telephone number is a faxing number or a phoning number. In alternative embodiments of the method 300 that employ only one source telecommunications device, the first decisional step 315 would not be needed. If a faxing number is determined in the first decisional step 315, then the information on the calling card is scanned in a step 320. The scanning in the step 320 may be of an appropriate type employing an optical scanner, a magnetic scanner or a scanner using Bluetooth or other appropriate wireless technology.

After scanning in the step 320, the information is then parsed in order to extract the telephone number in a step 325. The telephone number is parsed from the machine-readable information by extracting the number from a standard sequence arrangement. An alternative embodiment extracts the telephone number for faxing or phoning by seizing a ten digit number following an alpha or numeric indicator contained within the information.

Following the extraction of the appropriate telephone number, the telephone number is then transmitted to a source fax device in a step 330. In one embodiment, the telephone number may be transmitted over a hardwired connection as illustrated in FIG. 1. In another embodiment, the number may be transmitted to the fax machine using wireless technology. The wireless technology used may include Bluetooth or infrared connections.

A telecommunications session is then initiated in a step 335. The transmitted telephone number is automatically dialed by the source fax machine. Upon receiving the telephone number, the source fax machine bypasses the manual entry of the number and begins contact with a designated destination fax machine as indicated by the telephone number.

After automatically dialing the appropriate telephone number in the step 335, the destination fax machine is contacted through a telecommunications network. Once contacted and initiated, the destination fax machine completes the telecommunications transaction over the telecommunications network to receive the faxed information in a step 340. Finally, the initiation of the telecommunications session ends in a step 345.

Returning now to the first decisional step 315, if a fax number is not determined, then a phoning number may be determined in a second decisional step 350 and for this case, the method 300 proceeds to the step 320, as before. However, in this case a telephone is to be called rather than a fax machine, and the steps 320 through 340 are transacted with a source and receiving telephone. Then, the method 300 proceeds as before to the step 345. If a phoning number is not determined in the second decisional step 350, the method 300 returns to the step 310. For a technical overview concerning telecommunications systems, see "Communications Systems and Networks, 2nd Edition" by Ray Horak, Mark A. Miller, and Harry Newton, Hungry Minds, Inc. (2000), which is incorporated herein by reference.

Although the present invention has been described in detail, those skilled in the art should understand that they can make various changes, substitutions and alterations herein without departing from the spirit and scope of the invention in its broadest form.

What is claimed is:

1. An automated telephony interface for use with a source telecommunications device configured to initiate a telecommunications session, comprising:
   a scanner; and
   a session initiator, coupled to said scanner, that parses information read by said scanner, extracts a telephone number from said information, and determines whether to use said telephone number to initiate faxing or phoning based on an orientation of said information read by said scanner, said session initiator further transmitting a signal containing said telephone number to said source telecommunications device thereby initiating a telecommunications session.

2. The interface as recited in claim 1 wherein said session initiator determines whether to use said telephone number to initiate faxing or phoning based further on a status of said source telecommunications device.

3. The interface as recited in claim 2 wherein said status of said source telecommunications device is a ready status of a source telephone.

4. The interface as recited in claim 2 wherein said status of said source telecommunications device is a ready status of a source facsimile device.

5. A method of initiating a telecommunications session at a source telecommunications device, comprising:
   scanning information on a card with a scanner;
   parsing said information with a session initiator coupled to said scanner;
   extracting a telephone number from said information with said session initiator;
   determining with said session initiator whether to use said telephone number to initiate faxing or phoning based on an orientation of said information read by said scanner; and
   initiating a telecommunications session by transmitting a signal containing said telephone number from said session initiator to said source telecommunications device.

6. The method as recited in claim 5 wherein said determining is further based on a status of said source telecommunications device.

7. The method as recited in claim 6 wherein said status of said source telecommunications device is a ready status of a source telephone.

8. The method as recited in claim 6 wherein said status of said source telecommunications device is a ready status of a source facsimile device.

9. A method of initiating a telecommunications session at a source telecommunications device, comprising:

reading information having an orientation on a card;

parsing said information;

extracting a telephone number from said information;

determining whether to use said telephone number to initiate faxing or phoning based on said orientation of said information read; and transmitting a signal containing said telephone number to said source telecommunications device thereby initiating a telecommunications session.

10. The method as recited in claim 9 wherein said determining is further based on a status of said source telecommunications device.

11. The method as recited in claim 10 wherein said status of said source telecommunications device is selected from a ready status of a source telephone and a ready status of a source facsimile device.

* * * * *